United States Patent
Reiners et al.

(10) Patent No.: US 8,968,947 B2
(45) Date of Patent: Mar. 3, 2015

(54) OPERATING METHOD FOR A FUEL CELL SYSTEM

(75) Inventors: Karsten Reiners, Esslingen (DE); Sven Wenzel, Aachen (DE); Christoph Boese, Ortrand (DE)

(73) Assignee: Eberspaecher Climate Control Systems GmbH & Co. KG, Esslingen am Neckar (DE)

( * ) Notice: Subject to any disclaimer, the term of this patent is extended or adjusted under 35 U.S.C. 154(b) by 532 days.

(21) Appl. No.: 13/267,097

(22) Filed: Oct. 6, 2011

(65) Prior Publication Data
US 2012/0088167 A1  Apr. 12, 2012

(30) Foreign Application Priority Data
Oct. 6, 2010 (DE) .......................... 10 2010 042 034

(51) Int. Cl.
H01M 8/06   (2006.01)
(52) U.S. Cl.
CPC . *H01M 8/06* (2013.01); *Y02E 60/50* (2013.01)
USPC .......................................... 429/415; 429/427

(58) Field of Classification Search
USPC .................................................. 429/415, 427
See application file for complete search history.

(56) References Cited

FOREIGN PATENT DOCUMENTS

| DE | 10216691 A1 | 11/2003 |
|---|---|---|
| DE | 102006043037 A1 | 3/2008 |
| DE | 102007033150 A1 | 1/2009 |
| DE | 102007033151 A1 | 1/2009 |
| DE | 102009006983 A1 | 8/2009 |
| WO | WO 2008/031379 A1 | 3/2008 |

*Primary Examiner* — Mark F Huff
*Assistant Examiner* — Monique Wills
(74) *Attorney, Agent, or Firm* — Reinhart Boerner Van Deuren P.C.

(57) ABSTRACT

The present invention relates to a method for operating a fuel cell system, wherein the fuel cell system comprises at least one reformer for generating a reformate gas and at least one fuel cell for generating an electric current. An increased lifespan for the anode is achieved when with said anode an anode state value is continuously determined which correlates to a current degree of loading with carbon of the anode of the at least one fuel cell and when depending on the anode state value an oxygen-carbon ratio is varied in the reformate gas which is fed to the anode of the respective fuel cell.

29 Claims, No Drawings

OPERATING METHOD FOR A FUEL CELL SYSTEM

CROSS-REFERENCE TO RELATED PATENT APPLICATIONS

This patent application claims the benefit of German Patent Application No. 102010042034.4, filed Oct. 6, 2010, the entire teachings and disclosure of which are incorporated herein by reference thereto.

FIELD OF THE INVENTION

The present invention relates to a method for operating a fuel cell system.

BACKGROUND OF THE INVENTION

Usually, a fuel cell system comprises at least one reformer for generating a reformate gas and at least one fuel cell for generating electric current. In the case of high-temperature fuel cells, so-called SOFC-fuel cells, soot deposition on the anode can occur in operation, which over time reduces the efficiency of the anode or of the electrolyte. This is accompanied by a decrease of the efficiency of the fuel cell or of the fuel cell system.

BRIEF SUMMARY OF THE INVENTION

Embodiments of the present invention deal with the problem of providing an improved operating method for a fuel cell system, which is particularly characterized in that for the fuel cell system a comparatively high efficiency and/or a comparatively long lifespan can be achieved. In addition, the continuous deposition of soot on the anode is to be reduced for example.

According to an embodiment of the invention, this problem is solved through a new and improved method for operating a fuel cell system. In one embodiment, a method for operating a fuel cell system including at least one reformer for generating a reformate gas and at least one fuel cell for generating electric current is provided. The method includes determining, continuously, an anode state value, which correlates to a current degree of loading with carbon of an anode of the at least one fuel cell; and varying, dependent on the anode state value, an oxygen-carbon ratio in the reformate gas, which is fed to the anode of the at least one fuel cell. Advantageous embodiments are the subject of the dependent claims.

DETAILED DESCRIPTION OF THE INVENTION

Embodiments of the invention are based on the general idea of permanently monitoring an anode state value that correlates to a current carbon loading of the anode. Dependent on the determined anode state value, an oxygen-carbon ratio can now be varied in the reformate gas, which during operation of the fuel cell system is fed to the anode of the fuel cell. Here, embodiments of the invention utilize the realization that oxygen-carbon ratios exist which lead to an increase of the carbon loading of the anode and with which the reformer operates with a comparatively high efficiency, while with other oxygen-carbon ratios the reformer operates with a reduced efficiency and with which a reduction of the carbon loading of the anode can be observed. Accordingly, the fuel cell system according to an embodiment of the invention can be operated so that in times in which the anode state value is critical, i.e. too high, which corresponds to an elevated carbon loading of the anode, the reformate gas is fed to the anode with an oxygen-carbon ratio reducing the carbon loading, while in times in which the carbon loading of the anode is uncritical, the reformer can be operated in a state that is characterized by an increased efficiency and can particularly be located near the soot formation limit so that the oxygen-carbon ratios increasing the carbon loading can also be set in the reformate gas.

The increase of the efficiency of the fuel cell system in this case is based on the knowledge of the start of the soot formation and the possibilities of the operation of the system near the soot formation limit with maximum yield of hydrogen and carbon monoxide connected therewith. In addition, the knowledge of the parameters relevant to the soot formation offers a possibility of being able to effectively plan special regeneration phases into an operating cycle of the fuel cell system for regenerating the anode of carbon, as a result of which an extension of the lifespan of the fuel cell can be achieved.

It is clear that with a fuel cell system usually a plurality of fuel cells is present, which fuel cells can be particularly combined into a fuel cell stack. Each individual fuel cell in this case has an electrolyte, which on the one hand forms an anode and on the other hand a cathode. The reformate gas with such a fuel cell stack is jointly fed to the anodes of the individual fuel cells, while a parallel connection or a series connection can be realized.

For generating the reformate gas, an oxidant and a fuel for example are fed to the reformer. An oxygen-containing gas such as for example air is preferably suitable as oxidant. A hydrocarbon, which can be supplied in gaseous form or liquid is particularly suitable as fuel. Preferred hydrocarbons are for example natural gas and fuels such as for example diesel, biodiesel, gasoline, kerosene as well as any other synthetic fuels. By changing a lambda value between the oxidant fed to the reformer, and the fuel fed to the reformer the oxygen-carbon ratio in the reformate gas can now be varied. Here, the lambda value describes the ratio of the oxidant fed to the reformer based on the fuel fed to the reformer with respect to the oxidation reaction. At a lambda value of 1, oxidant and fuel are present in a stoichiometric ratio. At a lambda value greater than 1, oxidant and fuel are present over-stoichiometrically, so that an excess of oxidant is present. At a lambda value smaller than 1, there is an under-stoichiometric ratio of oxidant and fuel so that a deficiency of oxidant is present.

With a modern fuel cell system, it can be provided to return anode waste gas to the reformer in order to improve the energetic efficiency of the fuel cell system. The reformate gas contains gaseous hydrogen, which is converted on the anode during the generation of electric current. Depending on how much electric power is tapped off the respective fuel cell, the anode waste gas contains more or less hydrogen gas.

With a particularly advantageous embodiment, a return quantity of anode waste gas can now be taken into account when varying the oxygen-carbon ratios in the reformate gas, which is returned to the reformer from the anode of the respective fuel cell. Because the return of the anode waste gas influences the oxygen-carbon ratio of the reformate gas, the oxygen-carbon ratio by taking into account the current return quantity of anode waste gas can be more accurately set to the respective desired value. The returned quantity of anode waste gas influences the oxygen-carbon ratio in the reformate gas, provided the fuel cell converts. The conversion of the fuel cell contributes to the enrichment of the anode waste gas with oxygen bound in water and carbon and thus, via the recirculation of anode waste gas, to the increasing of the oxygen-carbon ratio in the reformate gas. Thus, the vapor-carbon ratio is changed, which likewise has an effect on the oxygen-carbon ratio.

Alternatively, the variation of the oxygen-carbon ratio in the reformate gas can be basically realized also in that the quantity of returned anode waste gas is changed. By doing so—as mentioned—the steam content in the reformate gas can be controlled, which likewise has an effect on the oxygen-carbon ratio. With this procedure, it is possible in principle to keep the oxygen quantity or air quantity fed to the reformer constant.

With a preferred embodiment of the operating method introduced here, an actual value for the oxygen-carbon ratio can be set for reducing the carbon loading of the anode of the respective fuel cell that is greater than a predetermined setpoint value for the oxygen-carbon ratio. This setpoint value of the oxygen-carbon ratio corresponds to that oxygen-carbon ratio with which in the fuel cell process on the anode an equilibrium is present on the anode, so that at least theoretically neither a deposition of carbon on the anode nor a reduction of the carbon loading takes place.

By setting an actual value of the oxygen-carbon ratio that is greater than said setpoint value a reduction of the carbon loading takes place. In other words, when the actual value is greater than the setpoint value a regeneration of the anode takes place.

A further development, wherein the setpoint value is predetermined dependent on a current component temperature is now particularly advantageous. Here, the component whose carbon loading is to be avoided or regenerated is observed in particular. Thus, this concerns in particular the anode proper or the electrolyte, so that the component temperature then corresponds to the anode temperature. Here, the invention utilizes the realization that the setpoint value, that is the equilibrium with regard to the carbon loading or with regard to the regeneration of the anode during the fuel cell process depends on the current component temperature or on the anode temperature. This dependency is taken into account when selecting the current setpoint value subject to the consideration of the component temperature or the anode temperature.

With another embodiment, a cold start cycle of the fuel cell system with varying oxygen-carbon ratio can be conducted so that the anode of the respective fuel cell following this cold start cycle has a carbon loading which deviates a maximum of 10% from the carbon loading which the anode of the respective fuel cell had prior to the cold start cycle. Alternatively, this cold start cycle with varying oxygen-carbon ratio can also be conducted so that the anode of the respective fuel cell after the cold start cycle has a carbon loading which is substantially of the same magnitude as before the cold start cycle. This embodiment takes into account that especially during the cold start a comparatively high soot loading or carbon loading of the respective anode can occur. Through the targeted setting of the oxygen-carbon ratio during the cold start cycle the carbon loading during the cold start cycle can be reduced or specifically set so that the respective anode after the cold start substantially has the same carbon loading as before the cold start. In particular, it is also possible because of this to cold-start and switch off the fuel system again several times without substantial normal operating phases having taken place in between. The treatment of the cold start cycle as closed entity regarding the carbon or soot loading avoids an excessive carbon or soot loading of the respective anode in the case of a plurality of cold starts in succession.

With a further embodiment, the carbon loading of the anode of the respective fuel cell can be specifically controlled through a corresponding variation of the oxygen-carbon ratio so that the carbon loading when switching-off the fuel cell system is in the region of a lower limit value or below it. Additionally or alternatively, the fuel cell system can be operated substantially neutrally with regard to the carbon loading of the anode of the respective fuel cell. The objective of the proposed operating strategy thus is a substantially carbon-neutral cycle or alternatively a carbon-averse cycle. In other words, the carbon loading of the anode of the respective fuel cell always moves in a comparatively narrow range so that long-turn neither an excessive carbon loading nor an excessive carbon reduction can be observed. In this way, it can be achieved that the fuel cell system upon switching-off always shows substantially the same carbon loading on the anodes without a special regeneration cycle having to be conducted for switching off. The realization regarding the carbon relevance of individual operating states and the incorporation of these in the control or their consideration in the control makes possible a targeted integration of operating phases with regeneration potential, that is regeneration phases in the cycle.

With a further embodiment, it can be provided that an oxygen-carbon ratio reducing the carbon loading of the anode of the respective fuel cell is practically set only when electric power to be output by the respective fuel cell is below a predetermined power limit. With this embodiment, it is taken into account that with an oxygen-carbon ratio leading to a reduction of the carbon loading, less hydrogen is present on the anode so that altogether less electric power can be generated or tapped off. The carbon regeneration is therefore conducted only in such operating phases, in which, at the respective fuel cell, not the full electric power is tapped off but a certain power reserve is present, which can then be utilized for the reduction of the carbon loading. A reformate gas with a corresponding regeneration potential always has less hydrogen than a reformate gas without such a regeneration potential. Insofar, the regeneration of carbon is initially always at the expense of the maximum yield of hydrogen and carbon monoxide that can be achieved through the reformation. Individually, the deposited carbon reacts with water and carbon dioxide to water and carbon monoxide within the regeneration, which then in turn corresponds to the growth of the yield of the concentration of hydrogen and carbon monoxide in the reformate gas regeneration.

In order to be able to provide the full electric power in contrast to this, an actual value is set for the oxygen-carbon ratio which is then correspondingly close to the predetermined setpoint value, particularly smaller than the predetermined setpoint value, while the setpoint value in turn can depend on the component temperature or on the anode temperature.

According to a preferred further development, it can now be provided to always set an oxygen-carbon ratio reducing the carbon loading of the anode of the respective fuel cell whenever the electric power to be given off by the respective fuel cell is below the predetermined power limit and when at the same time the carbon loading of the anode of the respective fuel cell is above a predetermined lower limit value. With this embodiment, it is taken into account that a regeneration is only practical when adequate carbon for the removal or reduction is available.

With another embodiment, an oxygen-carbon ratio reducing the carbon loading can be set when the carbon loading reaches a predetermined upper limit value. In addition or alternatively it can then be provided to set an oxygen-carbon ratio increasing the energetic efficiency of the reformer, accepting the carbon loading located close to the soot formation limit, when the carbon loading reaches a predetermined lower limit value. In this case, the carbon loading during the operation of the fuel cell system always fluctuates between an upper limit value and a lower limit value. The two limit values can be located comparatively close to each other. For example, the two limit values can be selected so that they deviate a maximum of 10% from each other.

With another embodiment, the fuel cell operation can be divided into a plurality of steps. Conceivable for example is the following step sequence. In a step A, an oxygen-carbon ratio reducing the carbon loading can be set when the carbon loading reaches a predetermined upper limit value. In a subsequent step B, an oxygen-carbon ratio increasing the energetic efficiency of the reformer, accepting the carbon loading located near the soot formation limit can be set when the carbon loading reaches a predetermined lower limit value. Up to that point, this operating mode corresponds to the embodiment already described further up, with which the carbon loading fluctuates between two limit values.

In a subsequent step C, an oxygen-carbon ratio reducing the carbon loading can now be set when the carbon loading reaches a predetermined second upper limit value, which is smaller than the first upper limit value. In a subsequent step D, it is possible to revert to step B. The step sequence B-C-D then follows in succession until the fuel cell system is switched off. With this procedure, it is taken into account that during a start cycle, occurring during the step A, other peripheral conditions can be maintained than during the normal operation, which takes place during the recurrent sequence of the steps B-C-D. In particular, even higher degrees of loading of the anode with carbon can thus be accepted for this start cycle.

According to another embodiment, the anode state value can also be calculated by means of the oxygen-carbon ratio and particularly by means of the component temperature mentioned further up. Through the deviation of the actual value from the setpoint value, it is possible, at least in theory, to calculate the current carbon loading of the anode. Practically, the operating phases reducing the carbon loading, with which the actual value of the oxygen-carbon ratio is above a predetermined setpoint value and the operating phases increasing the carbon loading, with which the actual value of the oxygen-carbon ratio is below a predetermined setpoint value, can be weighted differently with respect to the time. This means that an operating phase reducing the carbon loading has a different effect on the anode state value in terms of the amount than an operating phase of identical duration increasing the carbon loading. In particular, the operating phases increasing the carbon loading can be taken into account to a greater degree in terms of time or weighted to a greater degree than the operating phases reducing the carbon loading. For example, a weighting of 2:1 to 4:1 and particularly of 3:1 is conceivable. This means that an operating phase increasing the carbon loading is weighted in terms of time two times to four times, preferentially three times greater than an operating phase reducing the carbon loading.

In principle, an operating state with regeneration potential is to be maintained for as long as at least the quantity of carbon deposited in a preceding operating state with carbon formation potential or carbon deposition potential is regenerated. During the course of a cycle, the negative absolute conversion of carbon, i.e. its regeneration, has to significantly exceed the positive absolute conversion of carbon, i.e. its formation or deposition. This reveals a core idea of an embodiment of the present invention, namely the consideration of the at least theoretical conversion of carbon both positive, that is formation or deposition, as well as negative, that is regeneration, based on the knowledge of the direction of the conversion of carbon as a function of the temperature on the respective location of the deposition or regeneration, that is particularly on the anode, and as a function of the respective setting parameters of the reformation, that is especially air ratio, recirculation component and conversion of the fuel cell.

According to another advantageous embodiment, the anode state value can be determined by means of a spectrum analysis of the anode of the respective fuel cell. Through the spectrum analysis, the current "color" of the anode can be quasi determined. This can be realized with an optical sensor. Practically, a measured spectrum can be allocated to an anode state value via a characteristic. With the help of field trials, color ranges or spectral ranges can be allocated for example to different anode state values. The characteristic considered here can quasi represent a table and particularly a color table. However, in principle, any other suitable measuring technologies can be used in order to estimate or determine the positive and negative carbon conversions and ultimately the current anode state value.

It is of interest here that the relationship between the direction (positive or negative) of the carbon conversion is integrated in the control, so that from this during the running cycle information regarding the absolute quantity of deposited carbon and regenerated carbon on the respective relevant location, for example the anode, is supplied and this information is taken into account during the operating strategy of the overall system.

Particularly advantageous is a further development, with which in a family of characteristics a plurality of characteristics are stored which are assigned to different anode temperatures. Here it is taken into account that the anode temperature likewise influences the color or the spectrum of the anode. This influence is eliminated through the consideration of the anode temperature.

The respective component temperature on the component observed, for example at the inlet of the anode, can be used as substantial parameter for the characterization or quantification of direction (positive and negative) and quantity of the conversion of carbon.

Moreover, it is conceivable to determine the anode state value by means of at least one measured electric quantity of the respective fuel cell. Conceivable for example is the consideration of a voltage and/or of a resistance and/or of an impedance of the respective fuel cell. Such electric quantities correlate to the anode state and ultimately to the carbon loading so that via these measurements a comparatively reliable statement regarding the current anode state value can be made.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating a fuel cell system including at least one reformer for generating a reformate gas and at least one fuel cell for generating electric current, the method comprising:
    determining, continuously, an anode state value, which correlates to a current degree of loading with carbon of an anode of the at least one fuel cell, the anode state value being at least one of a color of the anode, a temperature of the anode, a voltage of the fuel cell, a resistance of the fuel cell, and an impedance of the fuel cell; and
    varying, dependent on the anode state value, an oxygen-carbon ratio in the reformate gas, which is fed to the anode of the at least one fuel cell.

2. The method according to claim 1, wherein varying the oxygen-carbon ratio in the reformate gas includes changing a lambda value between an oxidant fed to the reformer and a fuel fed to the reformer.

3. The method according to claim 2, further comprising, while varying the oxygen-carbon ratio, accounting for a return quantity of anode waste gas, which is returned to the reformer from the anode of the at least one fuel cell.

4. The method according to claim 1, wherein varying the oxygen-carbon ratio in the reformate gas includes changing a return quantity of anode waste gas which is returned to the reformer from the anode of the at least one fuel cell.

5. The method according to claim 1, wherein:
    the step of varying the oxygen-carbon ratio includes, for reducing the carbon loading of the anode of the at least one fuel cell, setting an actual value for the oxygen-carbon ratio that is greater than a predetermined setpoint value for the oxygen-carbon ratio, and
    the step of varying the oxygen-carbon ratio includes, for increasing the carbon loading of the anode of the at least one fuel cell, setting an actual value for the oxygen-carbon ratio that is smaller than a predetermined setpoint value for the oxygen-carbon ratio.

6. The method according to claim 5, wherein the predetermined setpoint value is dependent on at least one of a current component temperature and the anode temperature.

7. The method according to claim 1, wherein a cold start cycle of the fuel cell system with varying oxygen-carbon ratio is conducted so that the anode of the at least one fuel cell after the cold start cycle has a carbon loading which deviates a maximum of 10% from the carbon loading prior to the cold start cycle.

8. The method according to claim 1, further comprising controlling the carbon loading of the anode of the at least one fuel cell so that when the fuel cell system is switched off the carbon loading of the anode of the at least one fuel cell is in the region of a lower limit value or below said lower limit value.

9. The method according to claim 1, wherein the fuel cell system with respect to the carbon loading of the anode of the at least one fuel cell is substantially operated neutrally.

10. The method according to claim 1, wherein varying the oxygen-carbon ratio includes setting the oxygen-carbon ratio to reduce the carbon loading of the anode of the at least one fuel cell only when an electric power to be output by the at least one fuel cell is below a predetermined power limit.

11. The method according to claim 1, wherein varying the oxygen-carbon ratio includes setting the oxygen-carbon ratio to reduce the carbon loading of the anode of the at least one fuel cell only when the electric power to be output by the at least one fuel cell is below a predetermined power limit and when the carbon loading of the anode of the at least one fuel cell is above a predetermined lower limit value.

12. The method according to claim 1, wherein determining the anode state value includes calculating the anode state value by means of the oxygen-carbon ratio and by means of a component temperature.

13. The method according to claim 12, wherein operating phases reducing the carbon loading, at which the actual value of the oxygen-carbon ratio is above a predetermined setpoint value, and operating phases increasing the carbon loading, at which the actual value of the oxygen-carbon ratio is below a predetermined setpoint value, are weighted differently in terms of time.

14. The method according to claim 13, wherein the weighting depends on the conversion speed, which is the quantity of positive or negative conversion of carbon per unit time.

15. The method according to claim 14, wherein the conversion speed is determined by means of at least one parameter from the group consisting of: fuel power, air ratio, recirculation component and conversion of the fuel cell.

16. The method according to claim 14, wherein the conversion speed is initially calculated by means of the at least one parameter and subsequently corrected starting out from the chemical equilibrium with a kinetic approach.

17. The method according to claim 13, wherein the operating phases increasing the carbon loading are weighted to a greater degree in terms of time than the operating phases reducing the carbon loading.

18. The method according to claim 13, wherein the weighting takes place such that over an operating cycle of the fuel cell system in each case a negative absolute conversion of carbon, that is a regeneration, is achieved which is at least identical in magnitude as the positive absolute conversion of carbon, that is formation or deposition of carbon within this operating cycle.

19. The method according to claim 1, wherein varying the oxygen-carbon ratio includes setting the oxygen-carbon ratio to reduce the carbon loading, when the carbon loading reaches a predetermined upper limit value.

20. The method according to claim 1, wherein varying the oxygen-carbon ratio includes setting the oxygen-carbon ratio to increase the carbon loading is set when the carbon loading reaches a predetermined lower limit value.

21. The method according to claim 1, wherein:
    the step of varying the oxygen-carbon ratio includes setting, as step A, the oxygen-carbon ratio to reduce the carbon loading when the carbon loading reaches a predetermined first upper limit value;

further comprising:

setting, as step B, the oxygen-carbon ratio to increase the energetic efficiency of the reformer, accepting the carbon loading, substantially close to the soot formation limit, when the carbon loading reaches a predetermined lower limit value;

setting, as step C, the oxygen-carbon ratio to reduce the carbon loading, when the carbon loading reaches a predetermined second upper limit value that is smaller than the first upper limit value;

reverting, as step D, to step B; and repeating steps B-D sequentially until the fuel cell system is switched off.

22. The method according to claim 1, wherein determining the anode state value includes determining the anode state value by means of a spectrum analysis of the anode of the at least one fuel cell.

23. The method according to claim 22, further comprising allocating a measured spectrum to an anode state value by way of a characteristic.

24. The method according to claim 22, wherein in a family of characteristics a plurality of characteristics are stored which are allocated to different anode temperatures.

25. The method according to claim 22, further comprising calculating the carbon quantity currently present on the anode by taking into account a component temperature of the anode, a permanent calculation of a current speed and a direction of the carbon conversion.

26. The method according to claim 1, wherein determining the anode state value includes determining the anode state value by means of at least one measured electric quantity of the at least one fuel cell.

27. The method according to claim 26, wherein the measured electric quantity is at least one of a voltage, a resistance, and an impedance.

28. The method of claim 16, wherein the conversion speed is verified through measurement.

29. The method of claim 25, wherein the component temperature of the anode is taken at an inlet of the anode.

* * * * *